US012601834B2

(12) United States Patent
Gilliot et al.

(10) Patent No.: US 12,601,834 B2
(45) Date of Patent: Apr. 14, 2026

(54) DETECTION SYSTEM COMPRISING A PHASED ARRAY ANTENNA, AND ASSOCIATED DETECTION METHOD

(71) Applicant: THALES, Meudon (FR)

(72) Inventors: Adrien Gilliot, Merignac (FR); Vincent Corretja, Merignac (FR); Nicolas Leger, Merignac (FR); Alexandre Quinquis, Merignac (FR); Rodolphe Cottron, Merignac (FR)

(73) Assignee: THALES, Meudon (FR)

( * ) Notice: Subject to any disclaimer, the term of this patent is extended or adjusted under 35 U.S.C. 154(b) by 245 days.

(21) Appl. No.: 18/641,349

(22) Filed: Apr. 20, 2024

(65) Prior Publication Data

US 2024/0361450 A1 Oct. 31, 2024

(30) Foreign Application Priority Data

Apr. 27, 2023 (FR) ...................................... 2304250

(51) Int. Cl.
*G01S 13/90* (2006.01)
(52) U.S. Cl.
CPC ....... *G01S 13/9011* (2013.01); *G01S 13/9017* (2013.01); *G01S 13/9043* (2019.05); *G01S 13/9076* (2019.05)
(58) Field of Classification Search
CPC .. G01S 13/24; G01S 13/9011; G01S 13/9017; G01S 13/9043; G01S 13/9056; G01S 13/9076; G01S 2013/0245; G01S 7/024
See application file for complete search history.

(56) References Cited

U.S. PATENT DOCUMENTS

| | | | | | |
|---|---|---|---|---|---|
| 5,091,890 | A | * | 2/1992 | Dwyer | G01S 7/539 |
| | | | | | 367/99 |
| 5,414,433 | A | * | 5/1995 | Chang | H01Q 3/22 |
| | | | | | 342/372 |
| 6,870,500 | B2 | * | 3/2005 | Suess | G01S 13/9056 |
| | | | | | 342/25 C |
| 8,193,974 | B2 | * | 6/2012 | Logan | G01S 13/24 |
| | | | | | 342/159 |

(Continued)

FOREIGN PATENT DOCUMENTS

| | | |
|---|---|---|
| DE | 102013221756 B3 | 10/2014 |
| FR | 3027408 A1 | 4/2022 |

OTHER PUBLICATIONS

Gerhard Krieger et al.; "Multidimensional 1-10 Waveform Encoding: A New Digital Beamforming Technique for Synthetic Aperture Radar Remote Sensing", IEEE Transactions on Geoscience and Remote Sensing; vol. 46; No. 1; Jan. 2008; pp. 31-46.

*Primary Examiner* — Peter M Bythrow
(74) *Attorney, Agent, or Firm* — BakerHostetler

(57) ABSTRACT

A detection system includes a phased array antenna having unitary radiating elements, the system being suitable for, in each cycle, successively directing, by way of the successive application of a first and a second determined phase law to the electrical signals for supplying power to the array antenna, the antenna radiation towards a first target area (Z1), then a second target area (Z2), which is separate from the first target area (Z1), and determining an image of each target area (Z1) on the basis of the echoes received from each of the first and second target areas.

10 Claims, 3 Drawing Sheets

(56) References Cited

U.S. PATENT DOCUMENTS

| | | | | |
|---|---|---|---|---|
| 11,262,446 | B2 * | 3/2022 | Speed ................ | G01S 13/9076 |
| 2009/0109086 | A1 * | 4/2009 | Krieger ................ | G01S 13/904 |
| | | | | 342/25 F |
| 2011/0140952 | A1 * | 6/2011 | Kemkemian ......... | G01S 13/426 |
| | | | | 342/146 |
| 2016/0195607 | A1 * | 7/2016 | Roulston .............. | G01S 13/106 |
| | | | | 342/201 |
| 2018/0267158 | A1 * | 9/2018 | Kishigami ............ | G01D 5/249 |
| 2020/0174114 | A1 * | 6/2020 | Roemer ................ | G01S 13/90 |
| 2020/0348412 | A1 * | 11/2020 | Durham ................ | H01Q 21/28 |
| 2021/0132188 | A1 * | 5/2021 | Wang ................... | G01S 7/4026 |
| 2021/0215795 | A1 * | 7/2021 | Krieger .............. | G01S 13/9056 |
| 2024/0019565 | A1 * | 1/2024 | Levy .................. | G01S 13/5242 |

* cited by examiner

[Fig. 1]
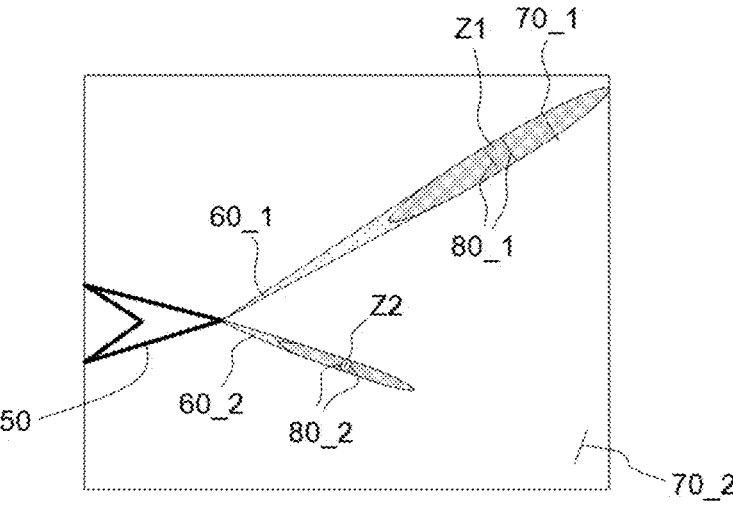
[Fig. 2]
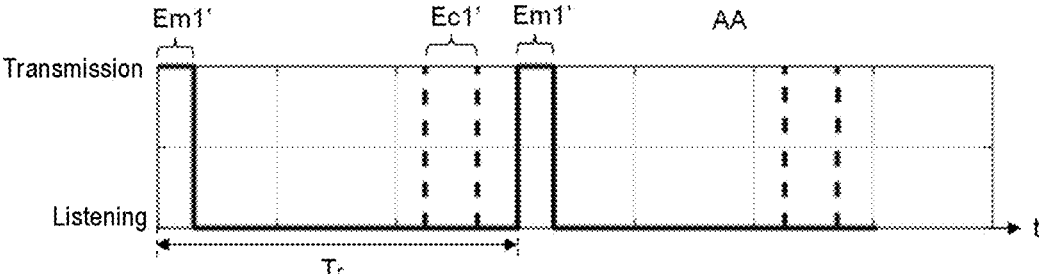
[Fig. 3]
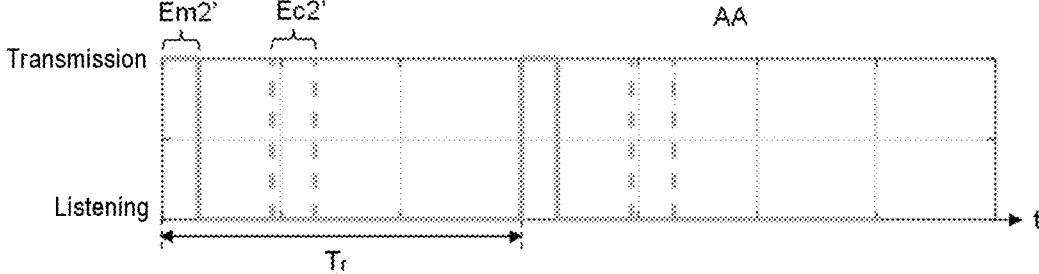

[Fig. 4]
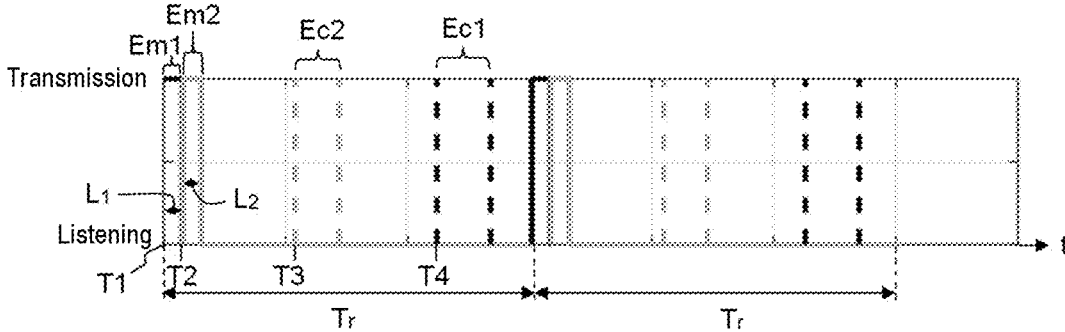
[Fig. 5]
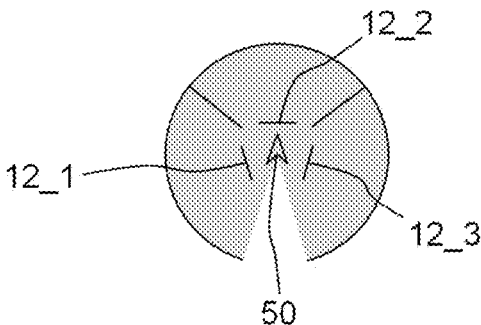
[Fig. 6]
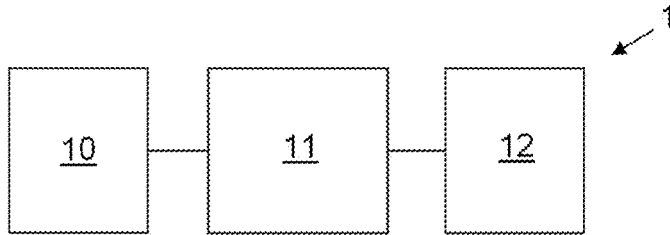

[Fig. 7]
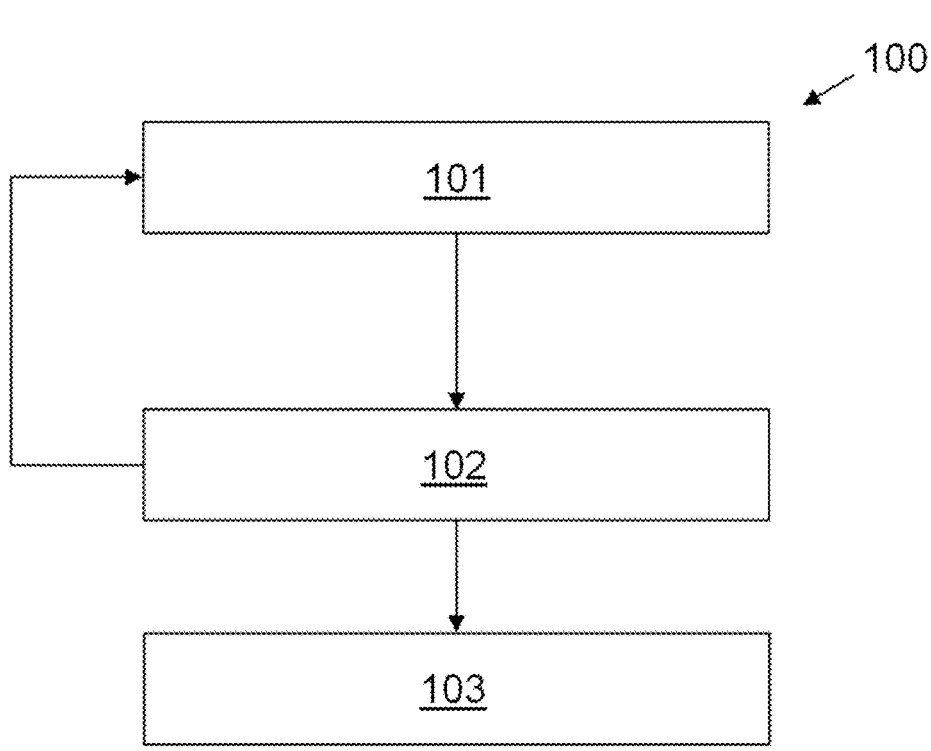

DETECTION SYSTEM COMPRISING A PHASED ARRAY ANTENNA, AND ASSOCIATED DETECTION METHOD

CROSS-REFERENCE TO RELATED APPLICATION

This application claims priority to French Patent Application No. 2304250, filed Apr. 27, 2023, which is incorporated by reference herein in its entirety.

FIELD OF THE INVENTION

The invention lies in the field of imaging stemming from the analysis of reflections (echoes), of transmitted signals, from obstacles encountered by the transmitted signals and using an electronic scanning antenna, allowing selective phase shifts of the electrical signals supplying power to the radiating elements to be applied according to linear phase laws and dynamically modified, the effect of which is to point the beam in different successive directions.

The bases of synthetic aperture radar imaging are provided in particular in L. FERRO-FAMIL, Principes de l'imagerie Radar à synthèse d'ouverture (RSO), Techniques de l'ingénieur, 2013.

BACKGROUND

Traditional synthetic aperture radar (SAR) or inverse synthetic aperture radar (ISAR) imaging methods transmit pulses with waveforms designed to construct a very high distance resolution and very high angular resolution image of the portion of ground of interest. Usually, only a fraction of the time used for receiving each pulse (generally the end) produces signal that is actually used by the imaging method.

Said methods consist in alternating a phase of transmitting one or more pulses, succeeded by a listening phase during which the radar system (the same goes for a sonar radar) digitizes and processes the received echoes. This alternation of transmission/listening phases is repeated a great number of times (depending on the transverse resolution desired for the final image), the digitized signals then undergoing a sequence of processing operations (compensation for migrations, Fourier transform, focusing, alignment with standards, etc.). In many cases, only a small portion of the listening phase produces a useful signal, and the bulk of the listening time is therefore wasted.

There is therefore a need to improve the efficiency of these imaging methods.

SUMMARY

To that end, according to a first aspect, the present invention describes a detection method in a detection system comprising a phased array antenna comprising unitary radiating elements, said system being suitable for, via said array antenna, transmitting waves and receiving echoes of said transmitted waves and for analysing the received echoes; said detection method comprising the following steps in each of the multiple consecutive processing cycles:

controlling the application of a first determined phase law to electrical signals for supplying power to the unitary radiating elements of the array antenna in order to direct the antenna radiation towards a first target area; the first controlled phase law being applied to said radiating elements in response to said control: at least one first wave transmission is performed, and echoes from said first wave transmission are received; then a first analysis of said received echoes is performed;

an image of the first target area is determined on the basis of at least said first analysis;

said method being characterized in that it moreover comprises the following steps during each of said cycles:

controlling the application of at least one second determined phase law to electrical signals for supplying power to said unitary radiating elements of the array antenna in order to direct the antenna radiation towards a second target area; the second phase law being different from the first law controlled during said same cycle; the second target area being separate from the first target area and the distance between the first target area and the array antenna being distinct from the distance between the second target area and the array antenna;

the second controlled phase law being applied to said radiating elements in response to said control: at least one second wave transmission is performed, and echoes from said second wave transmission are received; then a second analysis of said received echoes is performed;

an image of the second target area is determined on the basis of at least said second analysis.

The method according to the invention aims to make use of the flexibility of electronic scanning to address the aforementioned pointless listening times, by executing, in parallel with the imaging of a target area, one or more additional synthetic aperture imaging processes on another target area and by using the same unitary radiating elements (or at least some of them).

In embodiments, such a method will moreover comprise at least one of the following features:

for at least one of said cycles:

the elevation angle of the array antenna during the application of the second phase law is different from the elevation angle of the array antenna during the application of the first phase law; and/or the azimuth angle of the array antenna during the application of the second phase law is different from the azimuth angle of the array antenna during the application of the first phase law; and/or the resolution of the image of the first target area is distinct from the resolution of the image of the second target area; and/or the size of the image of the first target area is distinct from the size of the image of the second target area;

a first waveform is selectively used for the first wave transmission to the first target area and a second waveform, which is distinct from the first, is selectively used for the second wave transmission to the second target area according to one or more of the following provisions:

the first waveform is transmitted on a first carrier frequency F1 and the second waveform is transmitted on a second carrier frequency, which is distinct from the first carrier frequency;

when the first target area and the second target area are situated at different distances from the antenna, during the first, or second, transmission, the pulse duration and the repetition period during the first, or second, transmission are distinct and depend on the distance of the first, or second, target in relation to the antenna;

the polarization of the first waveform is distinct from the polarization of the second waveform, which are each defined on the basis of the observation geometry and the target area type, so as to maximize the target-to-clutter ratio of the image;

the first target area remains the same over multiple consecutive cycles and the second target area remains the same over multiple consecutive cycles;

during each of said cycles:

the first wave transmission to the first target area is performed, the first controlled phase law being applied to said radiating elements; then the second wave transmission to the second target area is performed, the second controlled phase law being applied to said radiating elements; then the echoes from the first, or second, wave transmission are received, the first, or second, controlled phase law then being applied to said radiating elements.

According to another aspect, the invention describes a detection system comprising a phased array antenna comprising unitary radiating elements, said system being suitable for, via said array antenna, transmitting waves and receiving echoes of said transmitted waves and for analysing the received echoes; the detection system being suitable for, in each of multiple consecutive processing cycles, controlling the application of a first determined phase law to electrical signals for supplying power to the unitary radiating elements of the array antenna in order to direct the antenna radiation towards a first target area; and the first controlled phase law being applied to said radiating elements in response to said control: in order to perform at least one first wave transmission and receive echoes from said first wave transmission; then in order to perform a first analysis of said received echoes and to determine an image of the first target area on the basis of at least said first analysis;

said detection system being characterized in that it is moreover suitable, during each of said cycles, for controlling the application of at least one second determined phase law to electrical signals for supplying power to said unitary radiating elements of the array antenna in order to direct the antenna radiation towards a second target area, the second phase law being different from the first controlled law during said same cycle, the second target area being separate from the first target area and the distance between the first target area and the array antenna being distinct from the distance between the second target area and the array antenna; then the second controlled phase law being applied to said radiating elements in response to said control, in order to perform at least one second wave transmission and receive echoes from said second wave transmission, then in order to perform a second analysis of said received echoes and to determine an image of the second target area on the basis of at least said second analysis.

In embodiments, such a system will moreover comprise at least one of the following features:

for at least one of said cycles: the elevation angle of the array antenna during the application of the second phase law is different from the elevation angle of the array antenna during the application of the first phase law; and/or the azimuth angle of the array antenna during the application of the second phase law is different from the azimuth angle of the array antenna during the application of the first phase law; and/or the resolution of the image of the first target area is distinct from the resolution of the image of the second target area; and/or the size of the image of the first target area is distinct from the size of the image of the second target area;

the detection system is suitable for selectively using a first waveform for the first wave transmission to the first target area and for selectively using a second waveform, which is distinct from the first, for the second wave transmission to the second target area according to one or more of the following provisions:

the first waveform is transmitted on a first carrier frequency F1 and the second waveform is transmitted on a second carrier frequency, which is distinct from the first carrier frequency;

when the first target area and the second target area are situated at different distances from the antenna, during the first, or second, transmission, the pulse duration and the repetition period during the first, or second, transmission are distinct and depend on the distance of the first, or second, target in relation to the antenna;

the polarization of the first waveform is distinct from the polarization of the second waveform, which are each defined on the basis of the observation geometry and the target area type, so as to maximize the target-to-clutter ratio of the image;

the first target area remains the same over multiple consecutive cycles and the second target area remains the same over multiple consecutive cycles;

the detection system is suitable for, during each of said cycles:

performing the first wave transmission to the first target area (Z1), the first controlled phase law being applied to said radiating elements; then performing the second wave transmission to the second target area (Z2), the second controlled phase law being applied to said radiating elements; then receiving the echoes from the first, or second, wave transmission, the first, or second, controlled phase law then being applied to said radiating elements.

BRIEF DESCRIPTION OF THE FIGURES

The invention will be better understood and other features, details and advantages will become more apparent on reading the description that follows, which is provided in nonlimiting fashion, and by virtue of the appended figures, which are provided by way of example.

FIG. 1 is an illustration of various target areas to be imaged by a bearer;

FIG. 2 illustrates cycles for imaging a first target area in the prior art;

FIG. 3 illustrates cycles for imaging a second target area in the prior art;

FIG. 4 illustrates cycles for imaging a first target area and a second target area in interleaved fashion in an embodiment of the invention;

FIG. 5 schematically represents a multi-panel antenna system in an embodiment of the invention;

FIG. 6 schematically represents a detection system in an embodiment of the invention;

FIG. 7 schematically represents the steps of a detection method in an embodiment of the invention.

Identical references may be used in different figures when they denote identical or comparable elements.

DETAILED DESCRIPTION

FIG. 6 depicts a detection system 1 in an embodiment of the invention.

The detection system 1 comprises in particular a control unit 10, a radar transmission and reception unit 11 and an antenna system 12, as depicted in FIG. 6.

This detection system 1 is an electronic scanning detection system, i.e. the antenna system 12 comprises one or more phased array antennas. An array antenna comprises unitary radiating elements distributed over a panel.

In the example under consideration, the detection system 1 is of SAR or ISAR RADAR type.

The detection system 1 is suitable for, in at least one acquisition direction under consideration pointing to a target, which will be called the target area hereinbelow, transmitting radar pulses, receiving and then analysing the echoes of these pulses.

The control unit 10 is suitable for transmitting controls to the radar transmission and reception unit 11. These controls define the phases of the respective electrical signals to be generated by the radar transmission and reception unit 11 and then to be supplied to the respective unitary radiating elements. These controls define when to trigger the phase changes of the electrical signals.

In a known manner, the control unit 11 is suitable for adjusting the phase value of each electrical signal intended to supply power to a unitary radiating element (and thus for adjusting the phase shifts between the signals supplying power to distinct radiating elements) so as to modify the transmission pattern of the array antenna ("electronic steering", used to focus the antenna gain in the desired direction of observation). On reception, similarly, the steering is performed by way of selective phase adjustment of the electrical signals delivered by each elementary radiating element. In one embodiment, in the reception phase, the same phase law as in the transmission phase is applied: this produces an antenna that "looks" in the same direction as during transmission. From an electrical standpoint in the reception phase, this actually allows arrangements to be made for all reception modules of the antenna to produce "in-phase" signals for the direction of observation, which can then be summed in a coherent manner, thus producing the expected antenna gain.

The radar transmission and reception unit 11 is suitable for, pursuant to the controls received from the control unit 10, generating electrical signals intended for the array antenna system 12 and for processing electrical signals received from the antenna system 12.

The detection system 1 in FIG. 1 is installed in a bearer 50, for example a fixed vehicle or a moving vehicle of aircraft type (aeroplane, helicopter, drone, glider, and so on), a satellite, a marine or submarine vessel, a wheeled vehicle, etc.

FIG. 1 schematically depicts a top view of a bearer 50, in this case an aeroplane, represented by a black arrow and carrying the detection system 1, and two distinct areas of interest, Z1 and Z2, corresponding to distinct angular ranges that are intended to be imaged, on which it is therefore necessary to sequentially focus the radiation pattern of the antenna 12.

In one embodiment, the distance between the first target area Z1 and the antenna 12 is distinct from the distance between the second target area Z2 and the detection system 1.

A first, or second, cone (with a dotted fill) represents the main lobe of the antenna pattern 12 when electronically steered to the first area Z1, or the second area Z2 (by applying a phase gradient to the antenna defined by a first, or second, phase law). The intersection between this main lobe and the surface (here ground or sea in the case of a radar, sea bed in the case of a sonar) approximately provides a conical section, here depicted with a denser dotted fill.

In the pointing direction focused on the area Zi, i=1, 2, a waveform is transmitted by the detection system 1 for the duration $L_i$, this then being followed by a listening period, for the duration $T_r-L_i$, during which any echoes are digitized. This produces the minimum and maximum distances orchestrated according to the generic formulae:

$$D_{min\,inst} = c \cdot \frac{L_i}{2} \quad D_{max\,inst} = c \cdot \frac{T_r}{2}$$

with c the propagation speed of the transmitted waves.

These generic formulae potentially need to be adapted according to the nature of the processing operations subsequently applied, but these processing operations are not the subject of the invention.

The distances $D_{min\,inst}$ and $D_{max\,inst}$ from the bearer 50 are depicted in FIG. 1 by black circle arcs for each of the 2 pointings (the method may also be used for more than 2 pointings), which are referenced by 60_1 and 70_1 for the pointing towards the area Z1 and by 60_2 and 70_2 for the pointing towards the area Z1.

In a general manner (material limit), we have:

$$FF_{min} \leq \frac{L_i}{T_r} \leq FF_{max}$$

where FF is the acronym for Form Factor. In particular, for some acquisition geometries, the footprint of the main antenna lobe (symbolized by the dense dots in FIG. 1) does not allow the whole of the illustrated range to be covered, this being the case of the example in FIG. 1. Generally, this limited footprint or the computational load of the imaging processing operations leads to the use of only a portion (called the 'useful range') of the distance range orchestrated by the waveform for constructing the image using synthetic aperture. The limits of this useful portion are visualized in FIG. 1 by way of the lines 80_1 relating to the pointing direction towards the area Z1 and by way of the lines 80_2 relating to the pointing direction towards the area Z2. The area Z1 is positioned between the two lines 80_1 and the area Z2 is positioned between the two lines 80_2. Each of these useful distance ranges corresponds to a useful listening period.

In the radar imaging systems from the prior art, the synthetic aperture imaging processing operations on the 2 (or more) areas Z1, Z2 in FIG. 1 are executed sequentially. These prior art systems are therefore subject to constraint (1): the total acquisition time $T_{e\,tot}$ is the sum of the unitary acquisition times $T_{e,i}$ ($i \in \{1,2\}$ in the example of FIG. 1, $i \in \{1, \ldots, N\}$ in a general manner).

FIG. 2 presents 2 transmission/reception cycles of duration $T_r$ of a radar system from the prior art, which is used for imaging the area Z1 only during the cycles. During each cycle, the radar therefore enters the transmission phase (transmitted wave Em1') once, and the listening phase once. The portion of the useful listening time (Ec1') corresponding to the useful distance range (section between the lines 80_1 in FIG. 1) is delimited by vertical dashes.

Similarly, FIG. 3 presents 2 transmission/reception cycles of a system from the prior art, which is used for imaging the area Z2 only during the cycles. During each cycle of duration $T_r$, the radar system therefore enters the transmission phase (transmitted wave Em2') once, and the listening phase once. The portion of the useful listening time (Ec2') corresponding to the useful distance range (section between the lines 80_2 in FIG. 1) is delimited by vertical dashes.

The method according to the invention aims to reduce this time required for imaging distinct areas by interleaving the formation of the images of the different areas over time. A system according to the invention is therefore subject to the constraint: the total acquisition time is the maximum of the different unitary acquisition times $T_{e,i}$. This sharp reduction in the total processing time is obtained by making joint use of the dead times (listening phases outside of useful listening) during the imaging method and of the flexibility of electronic scanning.

A detection method according to the invention comprises the following steps with a consecutive processing cycle, of duration $T_r$:

the control unit 10 controls the application of a first determined phase law (that for which the area Z1 is in the sector delimited by the lines 80_1) to the electrical signals for supplying power to the unitary radiating elements of the array antenna 12 in order to direct the antenna radiation towards Z1;

the first controlled phase law being applied to said radiating elements in response to said control: at least one first wave transmission is performed, and echoes from said first wave transmission are received; then a first analysis of said echoes received during the useful listening time is performed;

an image of the first target area is determined on the basis of at least said first analysis.

According to the method, during the same cycle, an acquisition on the area Z2 (transmission, useful listening) is performed, for the time of the cycle occupied neither by the transmission to the area Z1 nor by the useful listening for the echoes of this transmission.

In this way:

the control unit 10 controls the application of at least one second determined phase law, which is distinct from the first phase law (that for which the area Z2 is in the sector delimited by the lines 80_2), to the electrical signals for supplying power to said unitary radiating elements of the array antenna in order to direct the antenna radiation towards the area Z2;

the second controlled phase law being applied to said radiating elements in response to said control: at least one second wave transmission is performed, and echoes from said second wave transmission are received; then a second analysis of said received echoes is performed;

an image of the second target area is determined on the basis of at least said second analysis.

The second wave transmission is temporally positioned in the cycle under consideration so that this second wave transmission and the useful listening time for the echoes of this second wave transmission are outside firstly the time of the first wave transmission and secondly the useful listening time for the echoes of the first wave transmission.

During the next cycle, these steps are repeated. In one embodiment, in the next cycle, the same areas Z1, Z2 (and the corresponding phase laws) as in the previous cycle are considered. In another embodiment, the area Z1 and/or the area Z2 is modified.

In one particular embodiment, the detection system 1 is suitable for implementing the steps of the detection method 100 described hereinbelow with reference to FIG. 7.

In the cycle under consideration, in a step 101, the control unit 10 orders:

a transmission (Em1) of a first waveform to be performed at T1, for a duration $L_1$, pointing to the area Z1 (associated with the first phase law);

a transmission (Em2) of a second waveform to be performed at T2, for a duration $L_2$, pointing to the area Z2 (associated with the second phase law);

a reception of the echoes of the second waveform to be performed at T3, for a useful listening duration Ec2 (associated with the second phase law);

a reception of the echoes of the first waveform to be performed at T4, for a useful listening duration Ec1 (associated with the first phase law).

Following step 101, in step 102, the radar transmission and reception unit 11 generates the electrical signals pursuant to this sequencing and transmits them in due course to the array antenna 12, which will thus toggle successively, in terms of pointing, at T1 towards Z1, at T2 towards Z2, at T4 towards Z1, at $T_r$+T2 towards Z2, etc. The radar transmissions and receptions are then performed pursuant to the ordered sequencing.

The cycle of steps 101 and 102 is then repeated.

At the end of each cycle of steps 101-102, in a step 103, the electrical signals supplied by the antenna 12 on reception of the echoes during the useful listening Ec2 starting at T3 (and not the echoes received during the useful listening Ec1 starting at T4) are then processed (digitization, filtering operations, compensation for migrations, Fourier transform, focusing, alignment with standards) and an image of the area Z2 is determined by the radar unit 11 on the basis of these processed signals. Equally, the electrical signals supplied by the antenna 12 on the basis of the echoes received during the useful listening Ec1 starting at T4 (and not the echoes received during the useful listening Ec2 starting at T3) are processed and an image of the area Z1 is determined by the radar unit 11 on the basis of these processed signals.

A radar system (the same goes for a sonar system) can transmit only a certain amount of energy in a cycle time $T_r$. It may therefore be that constructing the interleaving involves decreasing the pulse lengths $L_i$ of the different interleaved waveforms so as not to exceed this limit (this is the case for the 4, the value of each $L_i$ is divided by 2 with regard to the graphs in FIGS. 2 and 3).

Moreover, the movement, where applicable, of the bearer 50 (in particular its approach towards or movement away from the imaged area) must be taken into account when preparing the interleaving. This is because, over the course of time, it is necessary to shift the timing of the useful listening ranges, and it should therefore be ensured in advance that the interleaved listening ranges cannot overlap in time (that is to say that sufficient spacing should be left between these ranges).

In one embodiment, at least one or more provisions among those hereinbelow will be taken into account:

if the cycle duration value $T_r$ for the different acquisitions to be interleaved is not the same, the different $T_r$ have a harmonic relationship among themselves (let Zi, i=1 to N, be the areas for which the radar imaging is interleaved, the value of $T_r$ for any area Zi is equal, to within a factor n or 1/n, to the value of $T_r$ for any area Zj, n being an integer);

the interleaving does not cause a collision between useful listening ranges;

the sum of the $L_i$ does not exceed the maximum form factor (that is to say generally that the radar 1 does not transmit more energy than it can at a given time);

the $L_i$ that result from the interleaving (that is to say which are potentially reduced) lead to an adequate signal-to-noise ratio (i.e. above a predefined threshold) for each final image.

By way of example, the phase laws used in the example hereinabove are of the type $$\exp\left(i\frac{2\pi}{\lambda}x_k\sin(\theta)\right),$$

with $\lambda$ the wavelength of the carrier, $x_k$ the distance of the k-th radiating element of the antenna from the centre of the antenna, and $\theta$ the desired electronic steering angle.

The interleaving case described hereinabove and illustrated in FIG. 4 is only one example: the sequencing between the transmission to the area Z1, the transmission to the area Z2, the useful listening relating to Z2 and the useful listening relating to Z1 may be different, depending on the location of the areas in particular. For example: transmission to the area Z1 then transmission to the area Z2, then useful listening relating to Z1, then useful listening relating to Z2. In another embodiment, where the aim is to minimize the number of times the transmission/reception chains are switched and/or the number of times the antenna is electronically steered (owing to an excessively great switching/electronic steering time, or software/hardware constraints linked to the maximum frequency of the antenna controls), the optimum sequencing becomes transmission to a first area, then useful listening relating to this first area, then transmission to the second area, then useful listening relating to the second area, involving in particular a halving of the recurrence period Tr (duration of a transmission/reception cycle) so as not to degrade the angular resolution of the SAR image in imaging iso time.

In embodiments, one and/or other of the following provisions is implemented during at least one cycle:

the elevation angle during the application of the second phase law is different from the elevation angle during the application of the first phase law;

the azimuth angle of the array antenna 12 during the application of the second phase law is different from the azimuth angle of the array antenna during the application of the first phase law; and/or the resolution of the image of the first target area is distinct from the resolution of the image of the second target area; and/or the size of the image of the first target area is distinct from the size of the image of the second target area.

It will be recalled that:

the elevation angle is the angle between the plane tangential to the earth's surface and the direction of observation of the antenna 12;

the azimuth angle is the angle between the viewing direction and North.

The invention, in a period $T_r$ that was necessary, in the prior art, for producing a single image, allows the production of multiple images of sectors that are not necessarily contiguous, in particular noncontiguous in azimuth and/or noncontiguous in elevation (each sector corresponding for example to the intersection between the main radiation lobe and the surface of interest: surface of the ground or of the sea or of the sea bed).

In one embodiment, during each cycle, the waveform Em1 is transmitted on a carrier frequency F1 that is distinct from the carrier frequency F2 on which the waveform Em2 is transmitted. The reception during the useful listening Ec1 is centred on F1, and is centred on F2 during the useful listening Ec2. This frequency separation prevents the different imaging processes from polluting one another; and/or a suitable waveform is defined selectively for each target area in terms of one and/or the other of these other parameters:

during each phase of transmission to a target area, the pulse duration and the repetition period depend on the distance of the target in relation to the antenna, the distance between the antenna and some of the different target areas being at different distances from the antenna, for example;

polarization of the transmitted wave defined on the basis of the observation geometry (for example, for large elevation angles, and under normal conditions, computation shows that it is of more interest to vertically polarize the transmitted waveform; conversely, horizontal polarization becomes preferable for small elevation angles) and the target type, so as to maximize the contrast (target-to-clutter ratio (sea or ground clutter depending on the applications)) of the image.

In return for a decrease in the signal-to-noise ratio of each image, the solution presented hereinabove, by making use of the scanning flexibility offered by electronic scanning RADAR systems in order to angularly interleave the construction of multiple SAR images, thus allows, in the same acquisition time that would be necessary in order to produce a single image, the production of multiple angularly spaced images, without decreasing the distance/frequency resolutions of the images obtained.

The interleaving has been described hereinabove with reference to two areas. The invention can of course be applied to a number N of areas greater than or equal to 3, then interleaving the construction of N images in the same cycle.

In one embodiment, the difference between the distance between the first target area Z1 and the distance between the second target area Z2 and the antenna 12 checks each of a set of constraints comprising at least one of the following constraints:

the listening windows associated with the areas Z1 and Z2 are necessarily distinct and do not overlap;

the listening windows are sufficiently spaced in time to allow the reception chain to be switched between the different transmission frequencies associated with the transmissions Em1 and Em2;

so as to guarantee a very low level of self-pollution of the radar system (i.e. the echoes from the transmission Em1 have a low probability of polluting the listening Ec2 associated with the area Z2, and vice versa, by way of sharp elevation angle separation of the imaged areas and the associated antenna pointings).

In this same embodiment, the first target area Z1 is also sharply separated from the second target area Z2 in terms of bearing angle (angular separation greater than the width of the main antenna lobe), so as to guarantee a very low level of self-pollution of the radar system (i.e. the echoes from the transmission Em1 have a low probability of polluting the listening Ec2 associated with the area Z2, and vice versa, by way of sharp bearing angle separation of the imaged areas and the associated antenna pointings).

In one embodiment, the control unit 10 of the detection system 1 is suitable for confirming that this difference does indeed check or does not check the set of constraints and for transmitting to the radar transmission/reception unit the controls for defining the phases of the electrical signals intended to target Z1, Z2 during transmission and reception only if the control unit has confirmed that this difference actually checks the set of constraints.

In one embodiment illustrated in FIG. 5, the antenna system 12 of the detection system aboard the bearer represented by the arrow 50 comprises three distinct array antennas (i.e. 3 panels) 12_1, 12_2 and 12_3, schematically represented by bars on all sides of the bearer, allowing the detection system to cover a bearing range of 330° (see hatched area), with a blind sector at the tail of the aircraft.

The invention has been described hereinabove with reference to a RADAR. It can of course be applied to any detection system equipped with a phased antenna and suitable for transmitting waves and analysing the reflections of these waves from obstacles, such as SONAR-based devices (SAS for "Synthetic Aperture Sonar"; ISAS for "Inverse Synthetic Aperture Sonar"), LIDAR, and so on.

For example, the invention is implemented in one embodiment in a submarine carrying a sonar for producing SAS (synthetic aperture sonar) images and imaging sea beds for the purposes of observation and navigation through recognition of the beds observed.

In one embodiment, the invention is used in ISAR mode so as to simultaneously image multiple maritime targets that are separate in bearing and elevation, by making use of the Doppler effect produced by their own movements and indicated by the echoes received: pitch/roll due to swell.

The invention claimed is:

1. Detection method in a detection system comprising a phased array antenna (12) comprising unitary radiating elements, said system being suitable for, via said array antenna (12), transmitting waves and receiving echoes of said transmitted waves and for analysing the received echoes; said detection method comprising the following steps implemented by the detection system in each of multiple consecutive processing cycles:

controlling the application of a first determined phase law to electrical signals for supplying power to the unitary radiating elements of the array antenna in order to direct the antenna radiation towards a first target area (Z1);

the first controlled phase law being applied to said radiating elements in response to said control: at least one first wave transmission is performed, and echoes from said first wave transmission are received; then a first analysis of said received echoes is performed;

an image of the first target area (Z1) is determined on the basis of at least said first analysis;

said method being characterized in that it moreover comprises the following steps implemented by the detection system during each of said cycles:

controlling the application of at least one second determined phase law to electrical signals for supplying power to said unitary radiating elements of the array antenna in order to direct the antenna radiation towards a second target area (Z2); the second phase law being different from the first law controlled during said same cycle, the second target area (Z2) being separate from the first target area (Z1) and the distance between the first target area (Z1) and the array antenna (12) being distinct from the distance between the second target area (Z2) and the array antenna (12);

the second controlled phase law being applied to said radiating elements in response to said control: at least one second wave transmission is performed, and echoes from said second wave transmission are received; then a second analysis of said received echoes is performed;

an image of the second target area (Z2) is determined on the basis of at least said second analysis.

2. Detection method according to claim 1, according to which, for at least one of said cycles:

the elevation angle of the array antenna (12) during the application of the second phase law is different from the elevation angle of the array antenna during the application of the first phase law; and/or the azimuth angle of the array antenna (12) during the application of the second phase law is different from the azimuth angle of the array antenna (12) during the application of the first phase law; and/or the resolution of the image of the first target area (Z1) is distinct from the resolution of the image of the second target area (Z2); and/or the size of the image of the first target area (Z1) is distinct from the size of the image of the second target area (Z2).

3. Detection method according to claim 1, according to which a first waveform is selectively used for the first wave transmission to the first target area (Z1) and a second waveform, which is distinct from the first, is selectively used for the second wave transmission to the second target area (Z2) according to one or more of the following provisions:

the first waveform is transmitted on a first carrier frequency F1 and the second waveform is transmitted on a second carrier frequency, which is distinct from the first carrier frequency;

when the first target area (Z1) and the second target area (Z2) are situated at different distances from the antenna (12), during the first, or second, transmission, the pulse duration and the repetition period during the first, or second, transmission are distinct and depend on the distance of the first, or second, target in relation to the antenna;

the polarization of the first waveform is distinct from the polarization of the second waveform, which are each defined on the basis of the observation geometry and the target area type, so as to maximize the target-to-clutter ratio of the image.

4. Detection method according to claim 1, according to which the first target area (Z1) remains the same over multiple consecutive cycles and the second target area (Z2) remains the same over multiple consecutive cycles.

5. Detection method according to claim 1, according to which, during each of said cycles:

the first wave transmission to the first target area (Z1) is performed, the first controlled phase law being applied to said radiating elements; then the second wave transmission to the second target area (Z2) is performed, the second controlled phase law being applied to said radiating elements; then the echoes from the first, or second, wave transmission are received, the first, or second, controlled phase law then being applied to said radiating elements.

6. Detection system comprising a phased array antenna (12) comprising unitary radiating elements, said system being suitable for, via said array antenna (12), transmitting waves and receiving echoes of said transmitted waves and for analysing the received echoes; the detection system being suitable for, in each of multiple consecutive processing cycles, controlling the application of a first determined phase law to electrical signals for supplying power to the unitary radiating elements of the array antenna in order to direct the antenna radiation towards a first target area (Z1); and the first controlled phase law being applied to said radiating elements in response to said control: in order to perform at least one first wave transmission and receive echoes from said first wave transmission; then in order to perform a first analysis of said received echoes and to determine an image of the first target area (Z1) on the basis of at least said first analysis;

said detection system being characterized in that it is moreover suitable, during each of said cycles, for controlling the application of at least one second determined phase law to electrical signals for supplying power to said unitary radiating elements of the array antenna in order to direct the antenna radiation towards a second target area (Z2), the second phase law being different from the first controlled law during said same cycle and the second target area (Z2) being separate from the first target area (Z1) and the distance between the first target area (Z1) and the array antenna (12) being distinct from the distance between the second target area (Z2) and the array antenna (12); then the second controlled phase law being applied to said radiating elements in response to said control, in order to perform at least one second wave transmission and receive echoes from said second wave transmission, then in order to perform a second analysis of said received echoes and to determine an image of the second target area (Z2) on the basis of at least said second analysis.

7. Detection system according to claim 6, wherein, for at least one of said cycles:

the elevation angle of the array antenna (12) during the application of the second phase law is different from the elevation angle of the array antenna during the application of the first phase law; and/or the azimuth angle of the array antenna (12) during the application of the second phase law is different from the azimuth angle of the array antenna (12) during the application of the first phase law; and/or the resolution of the image of the first target area (Z1) is distinct from the resolution of the image of the second target area (Z2); and/or the size of the image of the first target area (Z1) is distinct from the size of the image of the second target area (Z2).

8. Detection system according to claim 6, suitable for selectively using a first waveform for the first wave transmission to the first target area (Z1) and for selectively using a second waveform, which is distinct from the first, for the second wave transmission to the second target area (Z2) according to one or more of the following provisions:

the first waveform is transmitted on a first carrier frequency F1 and the second waveform is transmitted on a second carrier frequency, which is distinct from the first carrier frequency;

when the first target area (Z1) and the second target area (Z2) are situated at different distances from the antenna (12), during the first, or second, transmission, the pulse duration and the repetition period during the first, or second, transmission are distinct and depend on the distance of the first, or second, target in relation to the antenna;

the polarization of the first waveform is distinct from the polarization of the second waveform, which are each defined on the basis of the observation geometry and the target area type, so as to maximize the target-to-clutter ratio of the image.

9. Detection system according to claim 6, wherein the first target area (Z1) remains the same over multiple consecutive cycles and the second target area (Z2) remains the same over multiple consecutive cycles.

10. Detection system according to claim 6, suitable for, during each of said cycles:

performing the first wave transmission to the first target area (Z1), the first controlled phase law being applied to said radiating elements; then performing the second wave transmission to the second target area (Z2), the second controlled phase law being applied to said radiating elements; then receiving the echoes from the first, or second, wave transmission, the first, or second, controlled phase law then being applied to said radiating elements.

* * * * *